June 9, 1942.  G. V. WOODLING  2,285,481
AIR CONDITIONING
Filed Jan. 4, 1938  2 Sheets-Sheet 1
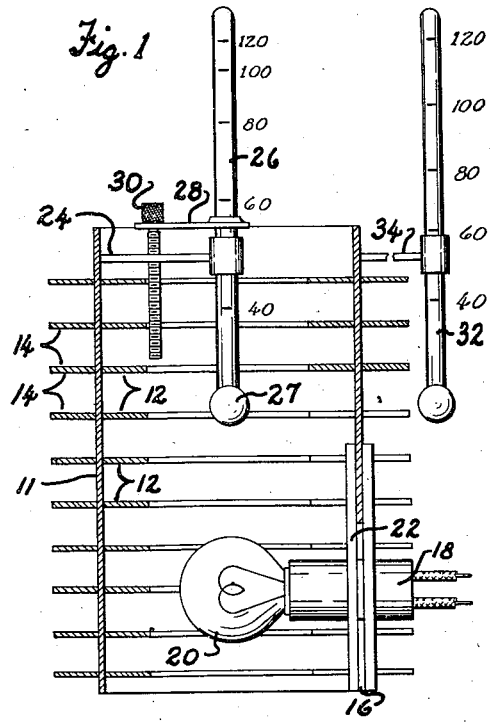
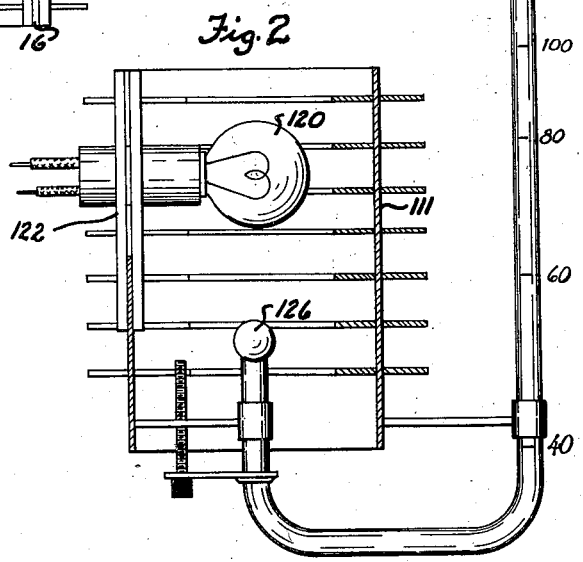
INVENTOR.
George V. Woodling
BY Spencer, Hardman & Fiehr
HIS ATTORNEYS.

Patented June 9, 1942

2,285,481

UNITED STATES PATENT OFFICE 2,285,481

AIR CONDITIONING

George V. Woodling, Cleveland, Ohio, assignor to General Motors Corporation, a corporation of Delaware Application January 4, 1938, Serial No. 183,336

2 Claims. (Cl. 73—336)

My invention relates, in general, to air conditioning, and more particularly to means for measuring and regulating the condition of the air to give the maximum degree of comfort.

The human comfort or discomfort, as regards feeling of warmth, depends largely upon the body temperature, and, therefore, upon the relation between the rate of production and dissipation of heat.

By the process of metabolism, heat is constantly generated within the body. Accordingly, this heat must be eliminated from the surface of the body and from the respiratory tract by radiation, convection and evaporation. Hence, to maintain a constant body temperature, the heat loss of the body must equal the heat produced. It is, therefore, apparent that any reduction in the elimination of heat from the body must result in a rise in the temperature and a corresponding feeling of discomfort. As the temperature of the air and surrounding objects rise, the loss of heat by convection and radiation decreases. When the air temperature reaches that of the body, the loss by radiation and convection ceases. Finally, as the air temperature exceeds that of the body, heat is transferred from the air to the body. As the temperature of the air rises and heat loss by radiation and convection decreases, the body endeavors to maintain temperature equilibrium by making available more perspiration, thus resulting in a greater heat loss by evaporation.

From the foregoing, one notes that there must necessarily exist certain combinations of temperatures, humidities, and air motions, which produce the same total heat loss by radiation, convection, and evaporation; and, therefore, the same feeling of comfort or discomfort. Therefore, the comfort or discomfort of the human body depend not only upon the temperature of the surrounding air as registered by a dry-bulb thermometer, but also upon the moisture content of the air, together with the air motion.

The combinations of temperature, humidity, and air movement which produce the same feeling of warmth are called "thermo-equivalent conditions" or, more generally, "effective temperatures" or "comfort indexes." Elaborate experiments conducted by the Research Laboratory of the United States Bureau of Mines, Pittsburgh, Pennsylvania, and published in the Transactions of the American Society of Heating and Ventilating Engineers from 1923 to the present date, by F. C. Haughten and C. P. Yaglou, show that this newly-developed scale of thermo-equivalent conditions, or effective temperatures not only indicates the sensation of warmth, but also determines the physiological effects on the body induced by heat and cold.

The effective temperature or the comfort index being an experimentally determined scale, unlike the dry-bulb and wet-bulb temperature scales, is a true measure or index of a person's feeling of warmth in all combinations of temperature, humidity and air movements. In other words, for any one given effective temperature, a person feels the same degree of warmth or coldness regardless of the dry-bulb temperature, the wet-bulb temperature, and velocity of the air required to produce that particular effective temperature.

Therefore, an object of my invention is to provide for giving a measurement of the human comfort.

Another object of my invention is to provide for giving a measurement of the human comfort which is based on the dry-bulb temperature, the relative humidity, the radiant heat and the air motion.

Another object of my invention is to utilize apparatus which is simple and inexpensive to manufacture, which is durable, and requires a minimum amount of upkeep. Heretofore, moisture responsive means of various types have proven unsatisfactory either from the standpoint of accuracy, responsiveness, or from the standpoint of upkeep. In the ordinary wet-bulb thermometer, for example, it is necessary to maintain a constant supply of liquid for the wick and it is also necessary to replace the wick from time to time with a new wick. Moisture responsive devices utilizing strips of paper, hair, or pieces of wood, for example, are inaccurate, slow to respond, require very delicate adjustments and are expensive to manufacture.

A further object of my invention is to regulate conditioning apparatus by means of my improved comfort device.

Further objects and advantages of the present invention will be apparent from the following description, reference being had to the accompanying drawings, wherein a preferred form of the present invention is clearly shown.

In the drawings:

Fig. 1 is a cross-sectional view in elevation of a first modification;

Fig. 2 is a sectional view in elevation showing a still further modification.

Figure 3:
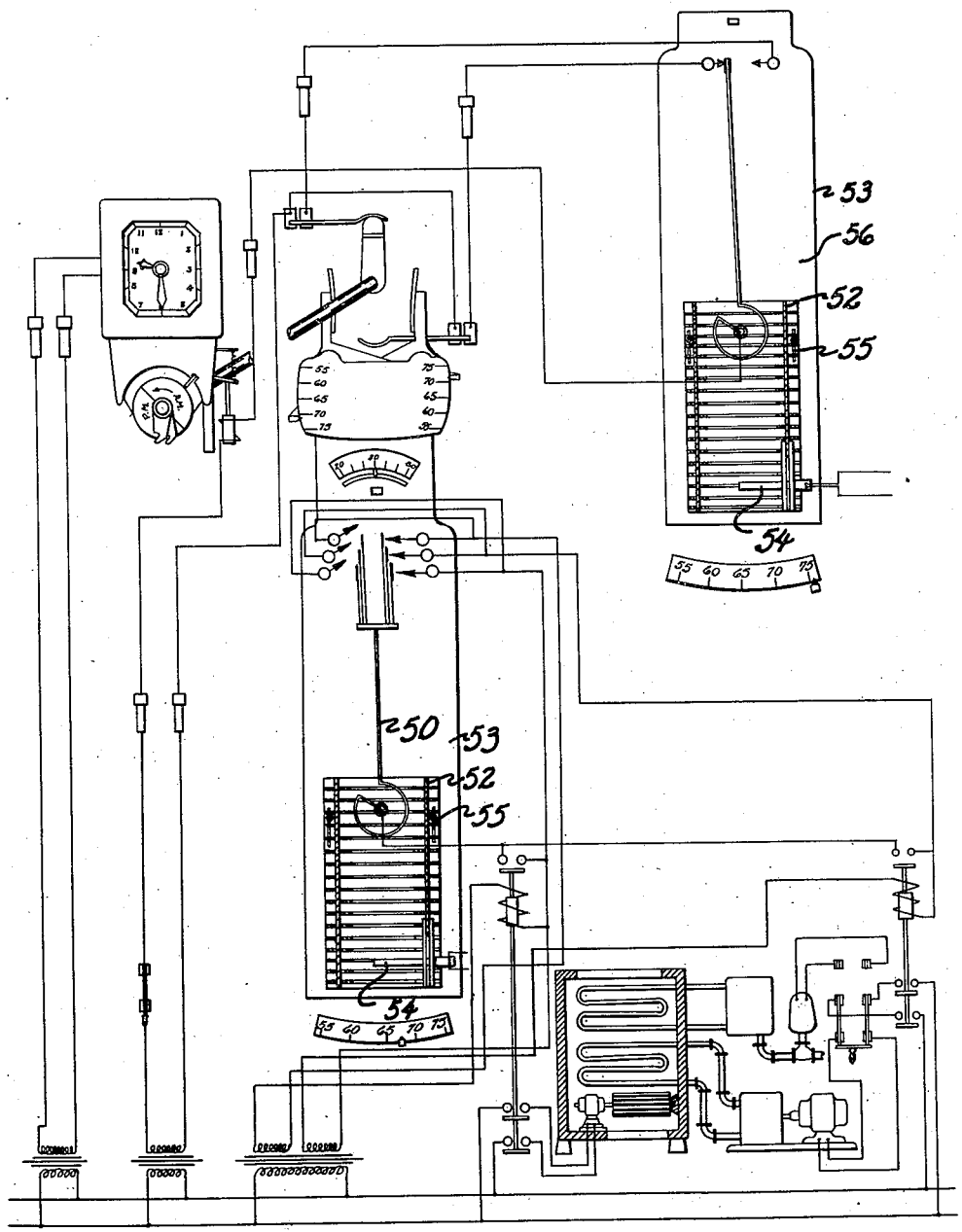
Fig. 3 is a view partly diagrammatic showing a still further modification which is designed for use in combination with air conditioning apparatus.

Referring now to the drawings, in Fig. 1 I have shown an effective temperature instrument which comprises a cylindrical chimney 11 provided with internal heat radiating fins 12 and external heat radiating fins 14. A slot 16 is provided adjacent the lower edge of the chimney, and slidably mounted within this slot there is provided a socket 18 which is provided with a lamp or any other suitable source of heat 20. The socket 18 also carries a pair of guides 22, one of which is located on the inside of the chimney and the other of which is located on the outside of the chimney. These guides serve to frictionally and adjustably hold the socket in place and also serve to prevent air from coming into the chimney through the slot. Carried by the chimney adjacent its upper end is a supporting bracket 24 which adjustably supports a capillary tube 26 having an enlarged bulb 27 filled with a temperature responsive fluid such as mercury. The capillary tube is held by bracket member 28 which in turn is adjustably held in place by the adjusting screws 30. With this arrangement, the capillary tube 26 may be adjusted vertically within the chimney. The capillary tube 26 is manufactured the same as an ordinary thermometer except that it is calibrated so as to read in terms of effective temperature; and, as will be pointed out hereinafter, the arrangement is such that the mercury within the tube expands and contracts in accordance with the effective temperature within the room. For convenience of comparison, an ordinary dry-bulb thermometer 32 is mounted adjacent the chimney by means of a bracket 34. Inasmuch as the comfort conditions within an enclosure depend on the dry-bulb temperature, the moisture content of the air, the air motion, and the radiant heat, it is obvious that an instrument which is to indicate the comfort conditions or, in other words, the effective temperature within an enclosure must take into consideration each of the above mentioned factors. My device is based on the well-known facts that there are four ways of transferring heat; namely, convection, conduction, radiation, and evaporation; and that the amount of evaporation taking place will be determined partly by the air motion and partly by the relative humidity in the room.

Referring to Fig. 1, it will be observed that the heater 20 will heat the air within the chimney. This will cause circulation of air from the room through the chimney in a well-known manner. The amount of circulation will be determined by various factors to be explained hereinafter. Heat is transferred from the heater 20 to the capillary tube 26 by convection, conduction and radiation. The amount of convection will be determined by the temperature differential between the temperature of the heater and the temperature in the enclosure and will be affected partly by the amount of moisture contained in the air. The amount of conduction between the heater 20 and the capillary tube 26 will be determined by the stillness of the air within the chimney and will also be determined by the amount of moisture in the air. Thus, the conductivity of air at 100° C. is 7.197; whereas, the conductivity of water vapor at 100° C. is 5.510. These values are the values given in Lange's Handbook of Chemistry. In the event that the source of radiant heat in the enclosure is great, the chimney will, by virtue of its construction, absorb a portion of this radiant heat and this will result in a higher effective temperature reading. Likewise, air motion within the room will tend to dissipate heat from the chimney and this will tend to reduce the effective temperature reading the desired amount. The consequence is that when the device is properly adjusted the expansion of the mercury within the capillary tube will be a reasonably accurate measure of the effective temperature within the room.

In order to make my device accurately respond to the conditions within the room, it is desirable to place the instrument at a point within the room at which the air motion, the radiant heat, and dry-bulb temperature are most representative of the actual conditions within the room. By virtue of the fact that the air is caused to circulate over the effective temperature device, the device will respond very quickly to changes within the room.

The amount of heat supplied by the heating element should be constant and should be such that, when the dry-bulb temperature in the enclosure is at 120° and the relative humidity in the neighborhood of 100%, the effective temperature device will read 120°. Likewise, when the dry-bulb temperature within the enclosure is at 45° and the air is still, the device should be calibrated to read 45°, since under these conditions the effective temperature equals the dry-bulb temperature irrespective of the relative humidity.

The calibration of the effective temperature indicating column 26 and the local heat source 20, in combination, with the other associated parts of the applicant's invention is such that a subtraction action is produced to take care of the ever increasing differences between the dry-bulb temperature and the effective temperature, as the dry-bulb temperature increases from approximately 46° to 120° F., as well as compensating for the thermo-equivalent condition of changes in air velocity and moisture.

While I have shown the heat source 20 placed below the effective temperature indicating member 26, the heat source may be placed in any suitable position with reference to the effective temperature indicating member so long as the same desirable results are obtained. For example, the heat source 20 may be placed along side of the effective temperature indicating member 26 or in any other suitable position, a few of which will be discussed hereinafter.

In lieu of a heat source such as 20, a cold source could also be used. The cold source could, for example, be a cold water coil, or it could be a small evaporator. In any case, the effective temperature indicating member would be calibrated so as to take into consideration the fact that a cold source is used in lieu of a heat source. The temperature of the cold source should be such that it would be below the temperature of the air to be measured.

In order to illustrate the operation of my device, the following illustration is given. When my device is placed in a room having a dry-bulb temperature of 70°, a relative humidity of 50% and in which the air is substantially still, the effective temperature indicated will be 66°. A change in the air velocity to 300 feet per minute, without any change in the dry-bulb temperature or the relative humidity, would cause the effective temperature reading to be lowered to 60.8° due to the increased amount of heat dissipated by the fins 14. Assuming, now, that the dry-bulb temperature remains the same and the air velocity remains 300 feet per minute, but the relative humidity drops to 20%, the effective temperature would be lowered approximately 1° due to the change in the amount of heat transferred from the heater to the bulb 27. Assuming, now, that the relative humidity remains at 20% and the air velocity remains at 300 feet per minute but the dry-bulb temperature increases to 90°, the effective temperature indicated would be much higher due to the increase in the room temperature, with the result that the device would indicate an effective temperature of 70°.

The modification shown in Fig. 2 is much the same as the modification shown in Fig. 1, except that the source of heat has been placed above the thermometer rather than below the thermometer. With this arrangement, most of the heat transferred from the heater to the bulb 126 is by conduction and radiation. The chimney 111, however, serves much the same purpose as the chimney 11, as shown in Fig. 1.

By varying the arrangement of the elements, as described hereinabove, it is possible to vary the responsiveness of the instrument to the various functions of the psychrometric condition of the air. For ordinary purposes, however, the device will be adjusted for giving a measurement of the effective temperature as given in the psychrometric chart prepared by the Research Laboratory of the United States Bureau of Mines and published in the transactions of the American Society of Heating and Ventilating Engineers for the year 1923.

In lieu of using a capillary tube for indicating the effective temperature, it is equally possible to use a bimetallic element carrying one or more contacts for closing one or more electric circuits. This type of instrument is shown in Fig. 3 in which the electrical system and the air conditioning apparatus is identical in all respects to that illustrated in Fig. 8 of my copending application Serial No. 648,822 filed December 24, 1932, now Patent No. 2,142,593. In lieu of using a bimetallic element responsive to the dry-bulb temperature and a humidistat for modifying the action of said bimetallic element as shown in said copending application, I utilize a bimetallic element 50 mounted within a chimney 52 corresponding to chimney 11 in Fig. 1. This chimney 52 is slidably supported on the instrument panel 53 by means of the pin and slot arrangement 55.

In the lower portion of the chimney I have provided an electrical heater 54 corresponding to the heater 20 in Fig. 1. The bimetallic member 50 together with the associated elements is mounted within the room, the air of which is to be conditioned. A similar effective temperature responsive instrument 56 is mounted outside of the enclosure and corresponds to the outside regulating device shown in Fig. 8 of my mentioned copending application. For a detailed description of the air conditioning apparatus and the control circuits employed in Fig. 3, reference is hereby made to my above identified application which contains a full and complete description of this arrangement.

By virtue of the arrangement shown in Fig. 5, it is possible to very accurately maintain the proper comfort conditions within the room. The system will be very sensitive to any changes in the psychrometric conditions of the air either within the room or outside of the room. The effective temperature responsive device shown therein is very durable, easy to manufacture, and, at the same time, responds very quickly and accurately to any change taking place within the room.

Aside from the advantages resulting from my invention as an effective temperature device, it provides, when used as a regulator for air conditioning equipment, a stabilizing action to control the comfort condition by eliminating peak air conditioning value. In other words, my invention when used as a regulator, provides smooth regulated comfort condition.

While the form of embodiment of the invention as herein disclosed, constitutes a preferred form, it is to be understood that other forms might be adopted, all coming within the scope of the claims which follow.

What is claimed is as follows:

1. A psychrometric instrument comprising in combination, a temperature responsive element, a heating element, and a chimney element enclosing said elements, said chimney element being provided with external heat conducting fins, said elements being so proportioned and arranged that said temperature responsive element responds to changes in the effective temperature.

2. An effective temperature instrument comprising in combination; a chimney; heat transfer fins on the outer wall of said chimney; temperature responsive means in said chimney; a source of heat inducing flow of air through said chimney; said chimney, temperature responsive means, heat transfer fins and source of heat being so constructed and arranged that said temperature responsive means responds to changes in the effective temperature produced by changes in the dry bulb temperature, the wet bulb temperature and the radiant heat.

GEORGE V. WOODLING.